US010391625B2

(12) United States Patent
Gang et al.

(10) Patent No.: US 10,391,625 B2
(45) Date of Patent: Aug. 27, 2019

(54) WORKBENCH WITH DOCKABLE STORAGE CART

(71) Applicant: Shanghai Cartec Industrial and Trading Co., Ltd., Shanghai (CN)

(72) Inventors: Wang Gang, Shanghai (CN); Xie Ying, Huangqiao Town (CN)

(73) Assignee: Shanghai Cartec Industrial and Trading Co., Ltd., Shanghai (CN)

( * ) Notice: Subject to any disclaimer, the term of this patent is extended or adjusted under 35 U.S.C. 154(b) by 151 days.

(21) Appl. No.: 15/364,155

(22) Filed: Nov. 29, 2016

(65) Prior Publication Data

US 2018/0147716 A1    May 31, 2018

(51) Int. Cl.
| | | |
|---|---|---|
| *B25H 1/12* | (2006.01) | |
| *B25H 1/04* | (2006.01) | |
| *B25H 3/02* | (2006.01) | |
| *B62B 3/00* | (2006.01) | |
| *B62B 5/06* | (2006.01) | |

(52) U.S. Cl.
CPC ............. *B25H 1/12* (2013.01); *B25H 1/04* (2013.01); *B25H 3/028* (2013.01); *B62B 3/005* (2013.01); *B62B 5/06* (2013.01); *B62B 2202/48* (2013.01); *B62B 2202/90* (2013.01); *B62B 2203/74* (2013.01); *B62B 2207/02* (2013.01)

(58) Field of Classification Search
CPC . B25H 1/12; B25H 1/04; B25H 3/028; B25H 1/06; B62B 3/005; B62B 3/02; A47B 31/00; A47B 96/00; A47B 88/41; A47B 88/417; A47B 88/60; A47B 88/00
USPC ...... 269/16, 17; 29/281.1; 312/249.8, 249.9, 312/249.11
See application file for complete search history.

(56) References Cited

U.S. PATENT DOCUMENTS 5,076,712 A * 12/1991 Salice ................. A47B 88/487
384/19

FOREIGN PATENT DOCUMENTS

| CN | 201471429 U | * | 5/2010 |
| CN | 201471429 U | * | 5/2010 |
| CN | 201471429 U |   | 5/2010 |

OTHER PUBLICATIONS

WEN 73015 Garage Glider Rolling Tool Chest Seat Amazon, Dec. 12, 2015 https://www.amazon.com/WEN-73015-Garage-Glider-Rolling/dp/B0199R9VWM/ref=sr_1_1?ie=UTF8&qid=1533131400 &sr=8-1&keywords=wen+garage+glider.*
CN201471429U english translation (Year: 2010).*

* cited by examiner

*Primary Examiner* — Monica S Carter
*Assistant Examiner* — Abbie E Quann
(74) *Attorney, Agent, or Firm* — Schwegman Lundberg & Woessner, P.A.

(57) ABSTRACT

An apparatus can include a workbench and a dockable cart. In an example, the apparatus can include a workbench frame including a first storage space and a docking area. A holding member can be coupled to the workbench frame to support the dockable cart using the workbench frame. The dockable cart can include a cart frame having a second storage space and a support element. In an example, the dockable cart can be moveable between a docked position and an undocked position. In the docked position, the support element can be engaged with the holding member to dock the dockable cart with the workbench frame including lifting the dockable cart. In the undocked position the dockable cart can be separated from the workbench.

22 Claims, 8 Drawing Sheets

WORKBENCH WITH DOCKABLE STORAGE CART

TECHNICAL FIELD

This document pertains generally, but not by way of limitation, to tool chests, such as mobile workbenches.

BACKGROUND

Tool benches can generally be used for the storage of tools and hardware. Tool benches can include a plurality of drawers and cabinets for storage. In some instances, tool benches can include a worktop for holding or supporting items to be worked on. Some tool benches include wheels for transporting the tool bench to alternate locations, such as work sites or the like. A stool may be used in conjunction with the tool bench for a worker to sit while using the worktop.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present application relates to devices and techniques for a workbench, such as a workbench with a dockable cart configured as a stool or toolbox. The following detailed description and examples are illustrative of the subject matter disclosed herein; however, the subject matter disclosed is not limited to the following description and examples provided. Portions and features of some embodiments may be included in, or substituted for, those of other embodiments. Embodiments set forth in the claims encompass all available equivalents of those claims.

The present inventors have recognized, among other things, that a problem to be solved can include docking a movable cart, such as a stool, with a workbench (such as including one or more of a work surface and toolbox) for storing the cart on the workbench and moving both the workbench and the cart in unison. The present subject matter can provide a solution to this problem, such as by coupling a holding member on a frame of the workbench. The holding member can be configured to engage a cart, such as a support element of the cart to dock the cart with the workbench. The cart can be moveable between a docked position and a deployed position. In an example, at least one of the workbench or the cart can include wheels for moving the respective workbench or cart. In the deployed position, the cart can be separated from the workbench, for example to use as a stool or a moveable toolbox. In the docked position, the support element can be engaged with the holding member to dock the cart with the workbench frame. In an example, the cart be lifted using the workbench frame so the workbench and cart can be moved in unison. In various examples, at least one of the holding member or the support element can include a ramp configured to lift the cart with respect to the workbench. For instance, the cart (e.g., the wheels of the cart) can be elevated off the ground for the cart to be stored on the workbench and move in unison therewith. In further examples, at least one of the holding member or the support element can include a roller to reduce sliding friction during docking and deploying the cart. In other words, the cart can be slidably engaged with the workbench. Specifically, in an example, the holding member can be slidably engaged with the support element. In a further example, at least one of the holding member or the support element can be pivotally coupled to the bench frame (e.g., the workbench) and the cart (e.g., cart frame) respectively. At least one of the pivotally coupled holding member or support element can be rotatable between a ramp configuration and a storage configuration. For instance, the ramp configuration can be configured to guide and raise the cart on to the workbench, and the storage configuration can be configured to hold the cart on the workbench. Accordingly, the cart can be elevated in the docked configuration so the workbench and the cart can be moved in unison. In the undocked configuration, the cart can be used for moveable storage, as a movable stool, as a movable work surface, or any combination thereof.

Figure 1:
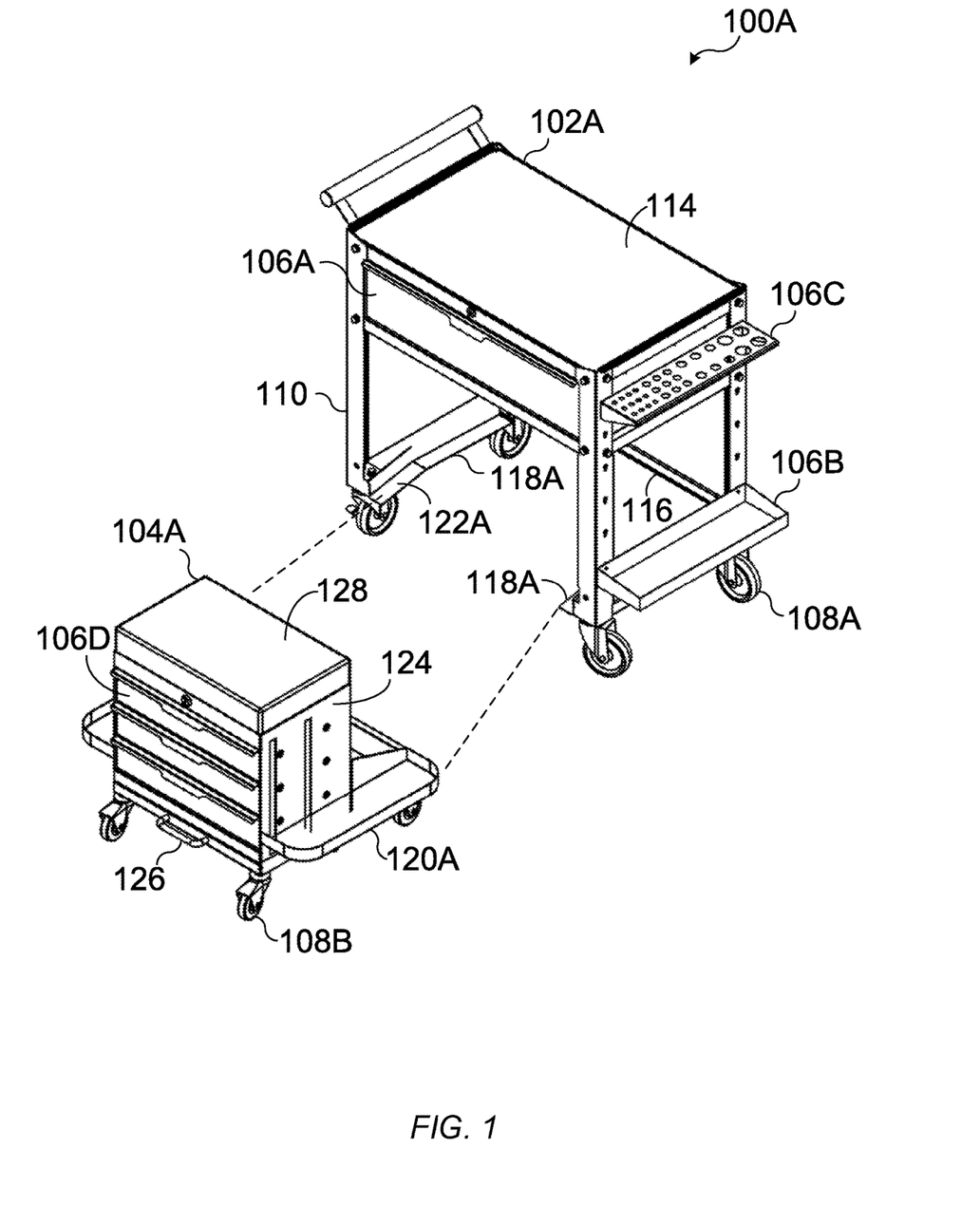
FIG. 1 illustrates an example of an exploded perspective view of an apparatus including a workbench and a dockable cart, according to an embodiment.

FIG. 1 illustrates an example of an exploded perspective view of an apparatus 100A including a workbench 102A and a cart 104A (also referred to herein as a dockable cart), according to an embodiment. In the example of FIG. 1, the apparatus 100A includes the cart, such as cart 104A and the workbench, such as workbench 102A. The cart 104A can be moveable between a docked position (shown in FIG. 8B and described further herein) and an undocked position (as show in FIG. 1). In various examples, the workbench 102A, the cart 104A, or both can include at least one storage space 106A-D. For instance, the storage space can include shelves, drawers (e.g., 106A or 106D), trays (e.g., 106B or 106C), or other storage spaces to hold tools or hardware. The workbench 102A and cart 104A can have a substantial weight, particularly when the workbench 102A or the cart 104A are used to store heavy items, such as tools, hardware, parts, or the like. In some examples, the workbench 102A or the cart can include wheels 108A to move the workbench 102A or the cart 104A. In further examples, the cart 104A can function as a stool to sit on as well as a movable toolbox which can be moved to a work location. The cart 104A is dockable with the workbench 102A to move the cart 104A and workbench 102A in unison. For instance, when docked, the cart 104A can be lifted so at least one wheel 108A or all wheels 108A of the cart 104A are off the ground or floor beneath. The cart 104A can function as movable storage, a movable work surface, a stool, or any combination thereof. For instance, the cart 104A can include storage space (e.g., shelves, drawers 106D, trays 106B-106C, or the like) as well as a seat 128. In an example, the seat 128 can be located on an upper portion of the cart 104A for sitting.

The workbench, such as workbench 102A can include a frame 110 (also referred to herein as a workbench frame). The frame 110 can provide the structural support for the workbench 102A. For instance, the construction of the frame 110 can include, but is not limited to, one or more beams, tubular elements, bars, panels, or other structural elements. Portions of the frame 110 can be welded or fastened together. In an example, the frame 110 can include legs, such as substantially vertical legs (e.g., within 30 degrees of vertical). The frame 110 can be constructed from a material including, but not limited to, steel, aluminum, iron, polymers, wood, composites, or the like.

In an example, the workbench 102A can be a tool box. As shown in the example of FIG. 1, the workbench 102A can include at least one storage space. The storage space can include shelves, cabinets, drawers (e.g., 106A), compartments, platforms, hangers, trays (e.g., 106B or 106C), or the like. The storage space can be configured to hold various items, such as tools, hardware, parts, or other items. For instance, the storage space can hold items for home improvement, auto repair, hobby items, or the like. In an example, at least one tray 106B can be coupled to the frame 110. The tray can be a bin, basket, shelf, container, or the like. In another example, the tray, such as a tray 106C can include at least one aperture for inserting a portion of a tool therethrough to serve as a holster, such as a handle of a hammer or the like.

In a further example, the workbench 102A can include a work surface 114. The work surface 114 can include a steel, wood, rubber, or other material for holding and supporting items, so work operations can be performed on the items. In the example of FIG. 1, the work surface 114 can be located on an upper portion of the workbench 102A.

The workbench 102A can include wheels 108A. In the example of FIG. 1, the wheels 108A are caster wheels. For instance, the wheels 108A can be coupled to the lower portion of the workbench 102A, such as at the lower portion of the legs of the frame 110. The caster wheels can swivel to roll the workbench 102A in any direction along the ground or floor. In an example, at least one of the wheels 108A can include a brake or other mechanism for locking the movement of the wheels 108A to prevent inadvertent movement of the workbench 102A.

In an example, the workbench 102A can include a docking area. For instance, the docking area can be a location to dock the cart, such as cart 104A, to the workbench 102A. As shown in the example of FIG. 1, the docking area can be located between the legs of the frame 110. The docking area can include an entry on from at least one side of the workbench 102A. For instance, as shown in FIG. 1, the docking area include an entry on a front side of the workbench 102A (e.g., a side from which a drawer or door opens). In an example, the storage space 106A can be located at least partially above the docking area. The docking area can be sized and shaped to fit the cart 104A at least partially inside of the docking area. The docking area can include clearance between the cart 104A and the workbench 102A when the cart 104A is in the docked position. For example, the docking space can provide clearance for wheels 108B coupled to the cart 104A. In an example, the frame 110 can include a cross bar 116 coupled between two or more legs. For instance, the cross bar 116 can be located near a distal end (e.g., lower end) of one or more legs to provide structural support to the workbench frame. In other examples, the docking area can be located on the side or back of the frame 110.

The workbench, such as the workbench 102A, can include a holding member, such as holding members 118A shown in the example of FIG. 1. In the docked position, the holding member 118A can support the cart 104A in an elevated position off the ground. For instance, the holding member 118A can be coupled to the frame 110, such as in the docking area. As shown in the example of FIG. 1, the holding member 118A can be coupled to a medial side of the frame 110, such as along a lower and inner portion of the frame 110. The holding member 118A can include a surface for engaging with the cart 104A, such as engaging with a support element, e.g., support element 120A described further herein. In an example, the holding member 118A, or a portion thereof, can be substantially horizontal with respect to the ground (e.g., within 30 degrees of horizontal). At least a portion of the holding member 118A can be located at a distance from the ground that is greater than or equal to a distance between the support element 120A and the ground. In various examples, the holding member 118A can include, but is not limited to, a flange, post, ledge, or the like for supporting the cart 104A at least partially off the ground.

Figure 4:
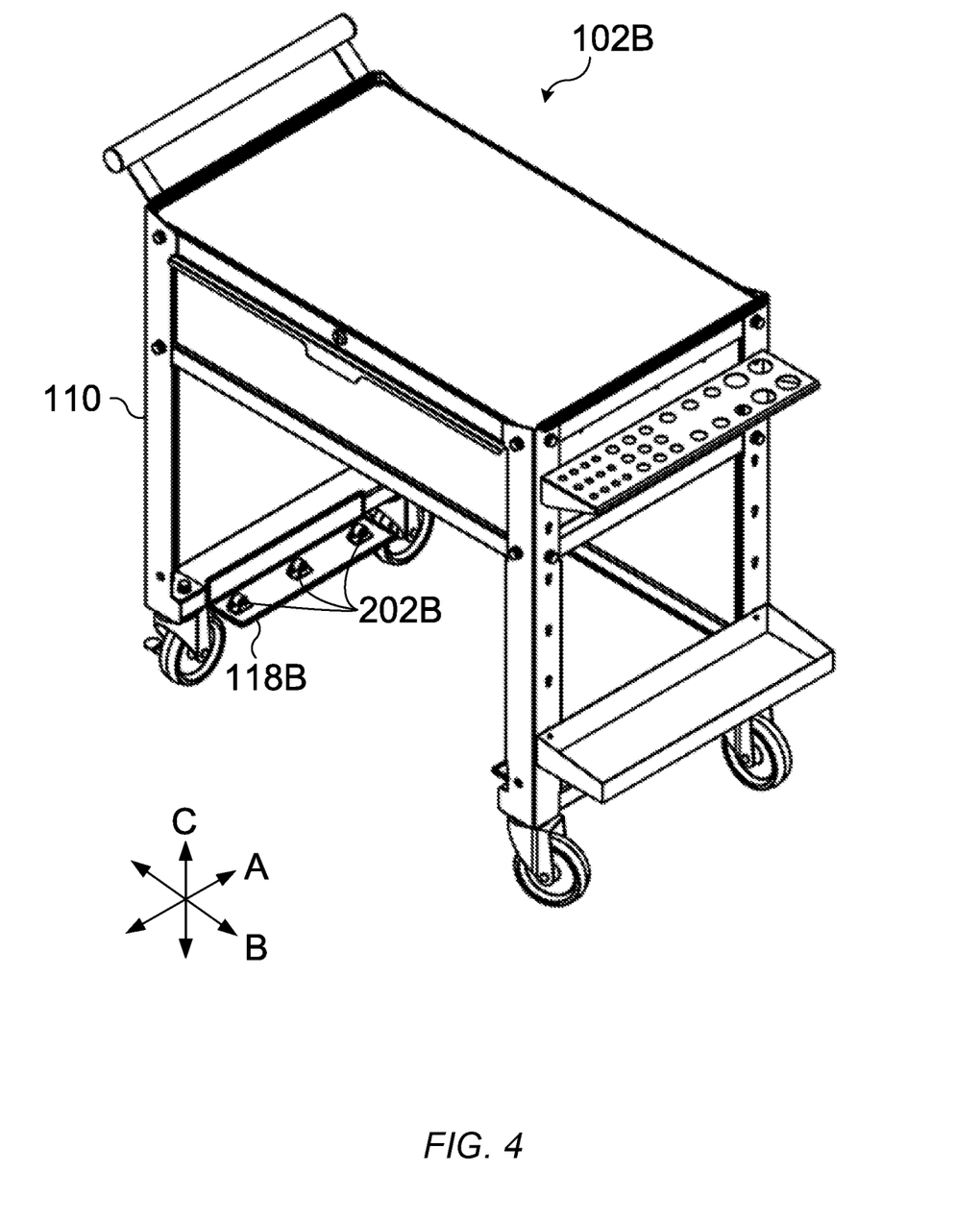
FIG. 4 depicts an example of a workbench including holding members having rollers, according to an embodiment.
Figure 6:
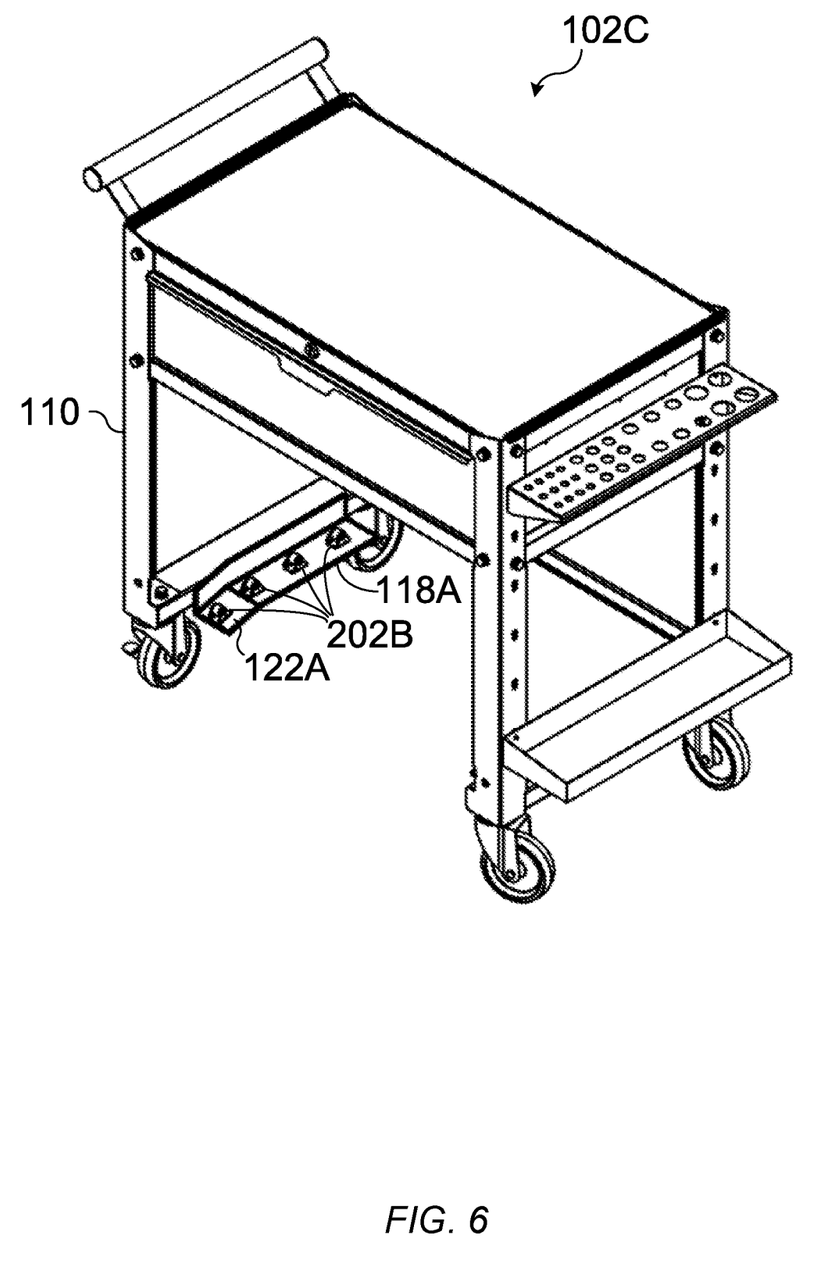
FIG. 6 is a perspective view of an example of a workbench including a holding member having a ramp and rollers, according to an embodiment.

As shown in FIG. 1, the holding member 118A can include a ramp 122A configured to engage with the cart 104A (such as support element 120A) and lift the cart from the ground as the cart 104A is moved from the undocked to the docked position. In further examples, the holding member 118A can include at least one roller (as shown in FIGS. 4 and 6 and described further herein). The roller can be positioned between the holding member 118A and the support element 120A to facilitate slidable engagement between the holding member 118A and the support element 120A. For instance, the roller can reduce sliding friction between the holding member 118A and the support element 120A. In various examples, the roller can include a wheel, rolling bearing, or the like.

The cart, such as dockable cart 104A, can include a frame 124 (also referred to herein as a cart frame). The frame 124 can provide the structural support for the cart 104A. For instance, the construction of the frame 124 can include, but is not limited to, one or more beams, tubular elements, bars, panels, or other structural elements. Portions of the frame 124 can be welded or fastened together. The frame 124 can be constructed from a material including, but not limited to, steel, aluminum, iron, polymers, wood, composites, or the like.

The cart 104A can include a secondary storage space (e.g., second storage space), such as storage space 106D. The storage space 106D can include shelves, cabinets, drawers, compartments, platforms, hangers, trays, or the like, as previously described with respect to storage spaces 106A-C. The storage space 106D can be configured to hold various items, such as tools, hardware, parts, or other items. For instance, the storage space 106D can hold items for home improvement, auto repair, hobby items, or the like. For instance, at least one tray can be coupled to the cart frame. In an example, the tray can be a bin, basket, shelf, container, or the like. In another example, the tray can include at least one aperture for inserting a portion of a tool therethrough to serve as a holster, such as a handle of a hammer or the like.

In an example, the cart 104A can include a plurality of wheels, such as wheels 108B, as previously discussed. The wheels 108B can be coupled to the cart 104A to facilitate maneuvering the cart 104A. For instance, the cart 104A can be rolled along the ground or floor. In an example, the wheels 108B can be caster wheels as previously discussed herein. In a further example, the cart 104A can include a handle 126. The handle 126 can be coupled to the cart frame 124 and can be configured to facilitate movement of the cart 104A between the docked position and the undocked position. As shown in the example of FIG. 1, the cart 104A includes the seat 128 as previously mentioned. The seat 128 can include a pad or other features to accommodate sitting. Accordingly, the cart 104A can be used as a movable tool box or stool.

As previously mentioned, the cart 104A can include at least one support element 120A. The support element 120A can support the cart 104A on the holding member 118A. For instance, the support element 120A can be configured to engage with the holding member 118A to hold the cart 104A in an elevated (lifted) position off the ground or floor. In various examples, the support element 120A can include, but is not limited to, a flange, post, ledge, or the like. In an example, the support element 120A, or a portion thereof, can be substantially horizontal with respect to the ground (e.g., within 30 degrees of horizontal). As shown in the example of FIG. 1, a first support element 120A can be located on a first lateral side of the cart 104A and a second support element 120A can be located on an opposing lateral side of the cart 104A. The cart 104A can have a dimension (e.g., between the first support element 120A and the second support element 120A) that is smaller than a dimension of the docking area of the workbench 102A. In other examples, the support element 120A can be located underneath the cart 104A, along a centerline of the cart 104A, along an upper side of the cart 104A, or in any other location configured to engage with the holding member 118A.

In various examples, the support element 120A can include a ramp, rollers, or any combination thereof. The ramp can be configured to lift the cart 104A from the ground using the holding member 118A as the cart 104A is moved from the undocked position to the docked position. For instance, as the cart 104A is moved into the docking area and the support element 120A comes into engagement with the holding member 118A, the ramp can guide the cart 104A off the ground for the holding member 118A to support the cart 104A using the workbench frame 110. Accordingly, the workbench 102A and the cart 104A can form a unitized apparatus 100. When in the docked configuration, the cart 104A and the workbench 102A can be movable in unison, for instance, using the wheels 108A coupled to the workbench 102A.

In a further example, the support element 120A can include at least one roller configured to reduce friction between the support element 120A and the holding member 118A. For instance, the roller can provide slidable engagement between the support element 120A and the holding member 118A. As previously described, the roller can include a wheel, rolling bearing, or the like.

In some examples, the cart 104A can be moved from the undocked position to the docked position with the aid of mechanical assistance. For instance, the cart 104A or the workbench 102A can include a winch, such as a hand winch or a powered winch, to assist in moving the cart 104A from the undocked position to the docked position. In another example, leverage can be used to move the cart from the undocked position to the docked position. For instance, a mechanical lever can be used to engage the cart 104A and pull the cart 104A onto one or more of the holding members 118A. In a further example, the mechanical assistance can lift the cart 104A, such as one or more wheels 108A of the cart 104A off the ground. Accordingly, the effort to move the cart 104A between the undocked position and the docked position can be reduced by providing the mechanical assistance.

Figure 2:
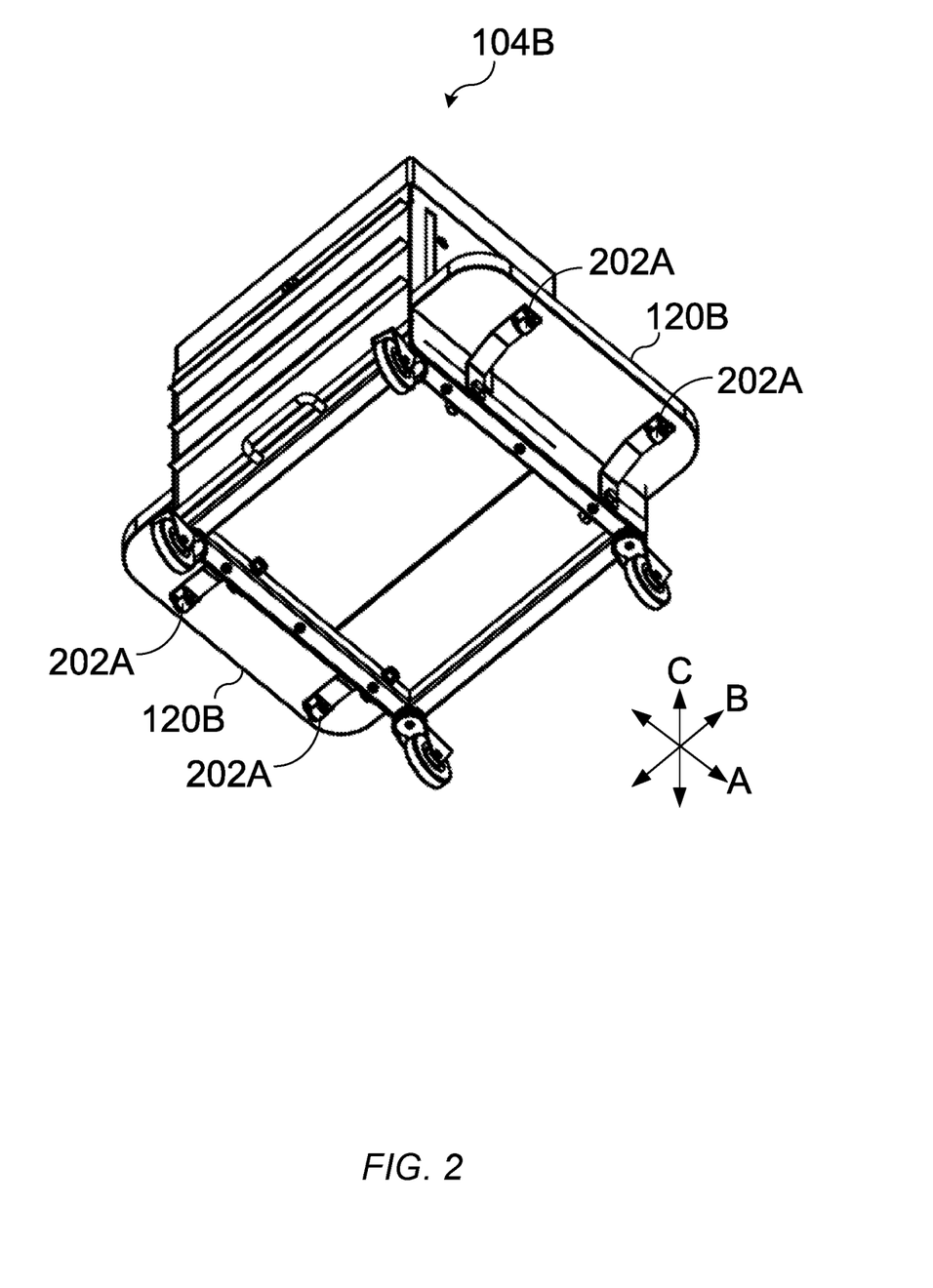
FIG. 2 is a bottom perspective view of an example of a dockable cart including rollers, according to an embodiment.

FIG. 2 is a bottom perspective view of an example of a dockable cart, such as cart 104B including rollers, according to an embodiment. For instance, the support element 120B can include at least one roller, such as roller 202A. In the example, shown in FIG. 2, the cart 104B includes four rollers 202A. The roller 202A can be configured to rotate about an axis aligned along a first direction A, a second direction B, a third direction C, or any combination thereof. For instance, in the Example of FIG. 2, the rollers 202A are configured to rotate about the second direction B that is substantially horizontal with respect to the ground (e.g., within 30 degrees of horizontal). For instance, the rollers 202A can be coupled to the support element 120B, such as a bottom of the support element 120B. The rollers 202A can roll along the holding member, such as a top of the holding member 120A between the undocked position and the docked position of the cart 104B. In an example, the rollers 202A can contact the ramp 122A. Accordingly, the cart 104B can be lifted with respect to the ground as the cart 104B is moved from the undocked position to the docked position based on the rollers 202A rolling up the ramp 122A. The rollers 202A can reduce sliding friction between the support element 120B and the holding member 118A. Accordingly, the amount of force to move the cart 104B between the undocked position and the docked position can be reduced. In further examples, the roller can be configured to rotate about an axis that is substantially vertical (e.g., within 30 degrees of vertical) or the rollers can be caster wheels configured to swivel around a pivot to rotate along various directions.

Figure 3:
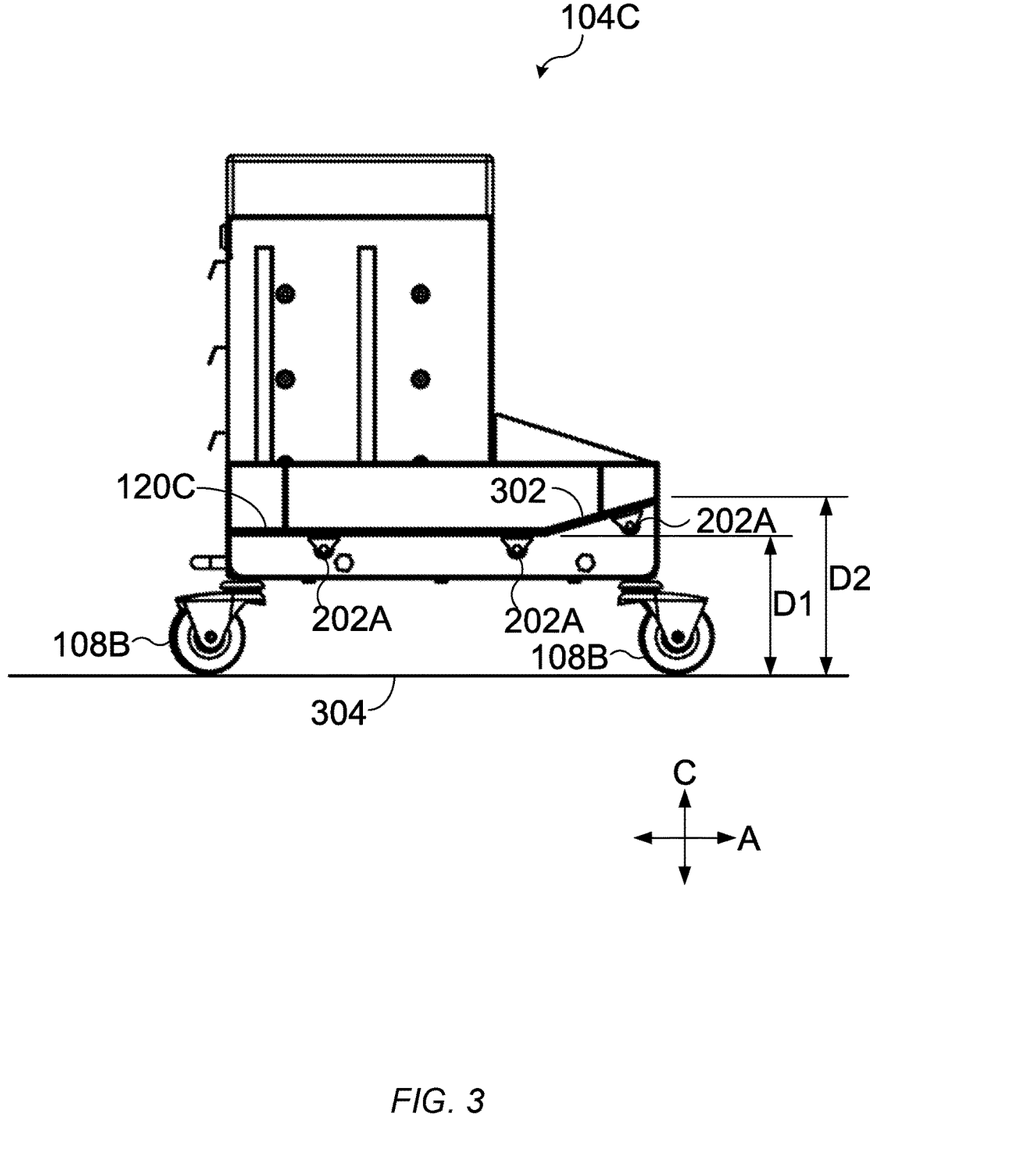
FIG. 3 illustrates an example of a side view of a dockable cart including a support element with a ramp and rollers, according to an embodiment.

FIG. 3 illustrates an example of a side view of a dockable cart, such as cart 104C, including a support element, such as support element 120C with a ramp 302 and rollers, such as rollers 202A, according to an embodiment. The ramp 302 can be configured to lift the cart 104C with respect to the ground (illustrated as the ground 304) as the cart 104C is moved from the undocked position to the docked position. For instance, the ramp 302 can be located on the bottom of the support element 120C. In the example shown in FIG. 3, the ramp 302 can include a first end that is elevated at a first distance D1 from the ground 304 and second end that is elevated at a higher second distance D2 from the ground 304. For instance, the holding member, such as holding member 118A, can be positioned at a distance from the ground, such as the first distance D1, the second distance D2, or any distance from the ground 304 therebetween. Accordingly, the holding member, such as holding member 118A, can be positioned to engage the support element 120C. For instance, the holding member can contact the support element 120C or the ramp 302 when the cart 104C is moved from the undocked position towards the docked position. The cart 104C can be lifted as the holding member translates along the ramp 302 and then along the support element. In the docked position, the cart 104C can be supported (e.g., wheels 108B off the ground 304) using the holding members of the workbench, such as workbench 102A. As previously described, the support element, such as support element 120C, can include at least one roller 202A. In the example, of FIG. 3, the support element 120C can include three rollers 202A. In an example, the roller 202A can be located on the ramp 302, a substantially horizontal portion of the support element 120C, or both as shown in FIG. 3.

FIG. 4 depicts an example of a workbench 102B including a holding member 118B having rollers 202B, according to an embodiment. For instance, the holding member 118B can be substantially horizontal (e.g., within 30 degrees of direction A), as show in the example of FIG. 4. At least one roller, such as roller 202B, can be coupled to the holding member 118B. In an example, the roller 202B can be coupled to an upper side of the holding member 118B. As shown in FIG. 4, the holding member 118B can include three rollers 202B.

Figure 5:
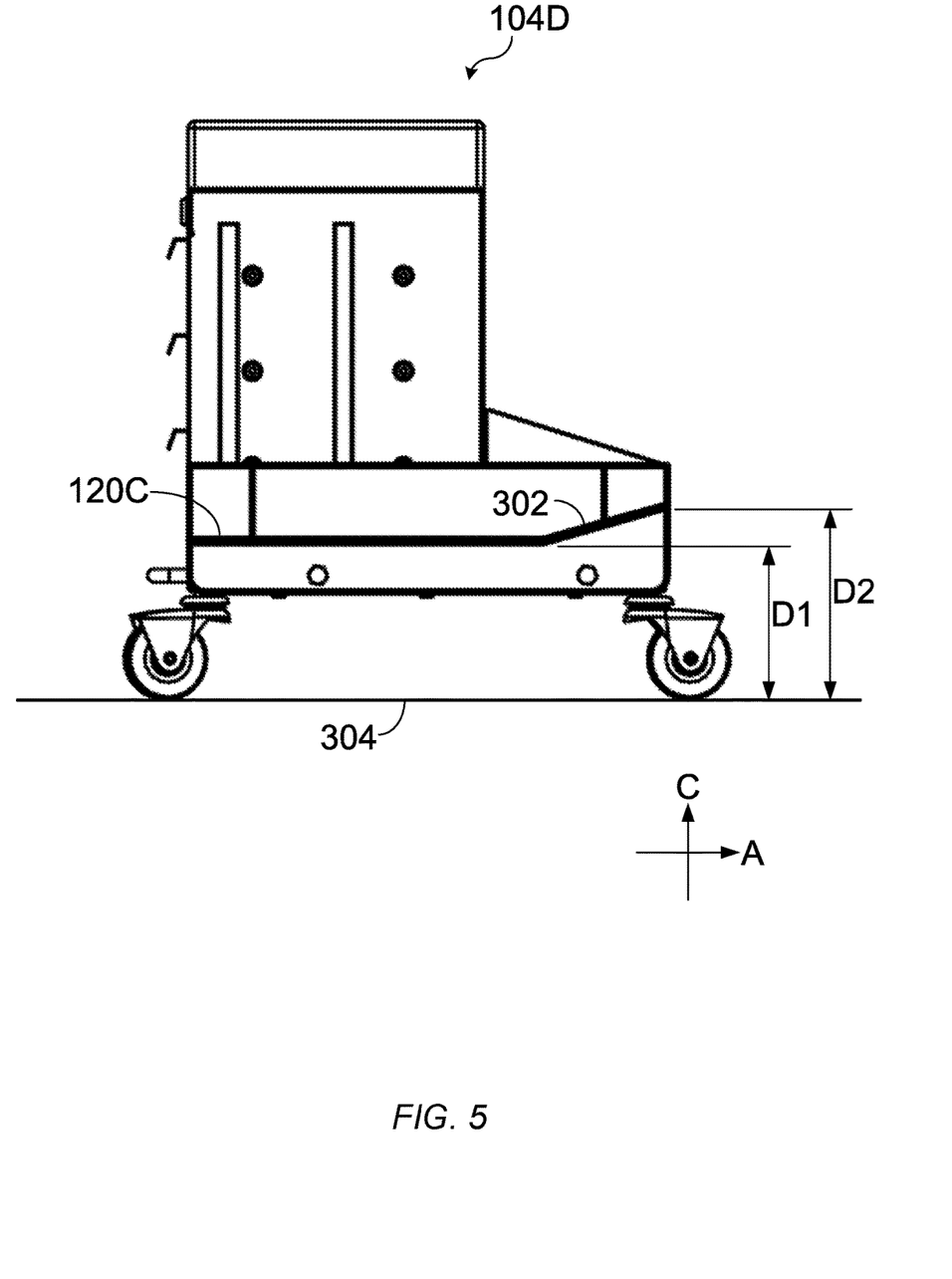
FIG. 5 illustrates an example of a side view of a dockable cart including a support element with a ramp, according to an embodiment.

FIG. 5 illustrates an example of a side view of a dockable cart, such as cart 104D including a support element, such as support element 120C with a ramp 302 (as previously described herein), according to an embodiment. The holding member, such as holding member 118B can be positioned on the frame 110 at the first distance D1, second distance D2, or at a distance therebetween. The ramp 302 can engage the holding member 118B, a roller 202B coupled to the holding member 118B, or both as the cart 104D is moved from the undocked position to the docked position. Accordingly, the cart 104D can be lifted off the ground 304 or partially off the ground 304 (e.g., in direction C) as the ramp 302 translates along the holding member 118B or roller 202B toward the docked position (e.g., in direction A). The roller 202B can engage the lower side of the support element 120C, the ramp 302, or both and can reduce friction between the holding member 118B and the support element 120C when the cart 104D is moved (e.g., translating along the holding member 118B) between the undocked position and the docked position.

FIG. 6 is a perspective view an example of a workbench 102C including a holding member, such as holding member 118A having a ramp 122A and rollers 202B, according to an embodiment. For instance, the holding member 118A can include a substantially horizontal portion, and the ramp 122A can be located on a docking end of the holding member 118A. As shown in the example of FIG. 6, the holding member 118A can include at least one roller 202B as previously described. The roller 202B can be located on the substantially horizontal portion of the holding member 118A, the ramp 122A, or both (as shown in FIG. 6).

Figure 7:
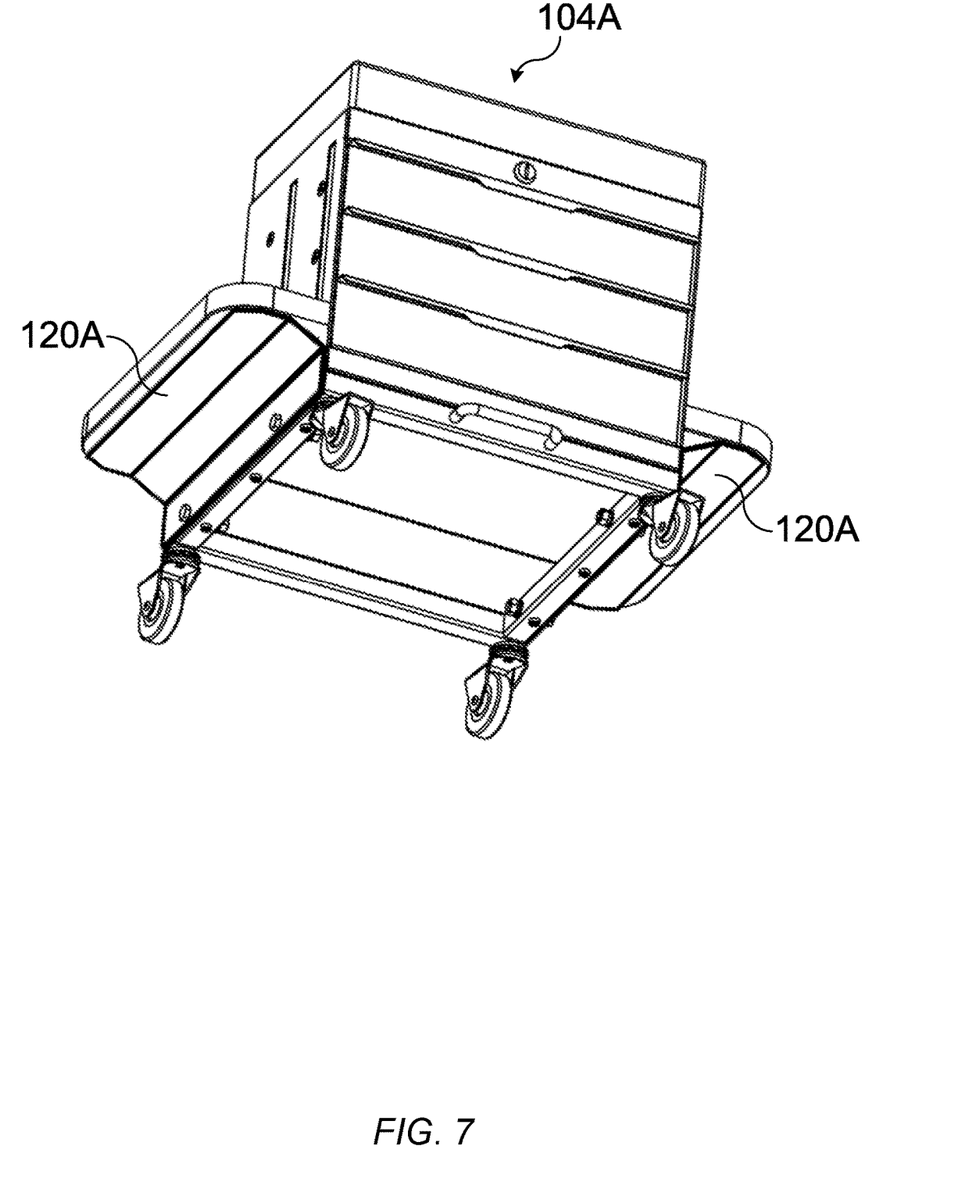
FIG. 7 illustrates a bottom perspective view of an example of a dockable cart including a support element, according to an embodiment.

FIG. 7 illustrates a bottom perspective view of a dockable cart, such as cart 104A including the support element 120A, according to an embodiment. As shown in the example of FIG. 7, the support element 120A can be substantially horizontal. For instance, the support element 120A can be straight (e.g., without a ramp). In some examples, the cart 104A can dock with a workbench, such as workbench 102A or 102C. When the cart 104A is moved from the undocked position to the docked position, the substantially horizontal support element 120A can be moved into engagement with the ramp, such as ramp 122A. Accordingly, the cart 104A can be lifted with respect to the ground as the support element 120A translates along the ramp 122A or the rollers 202B toward the docked position.

Figure 8A:
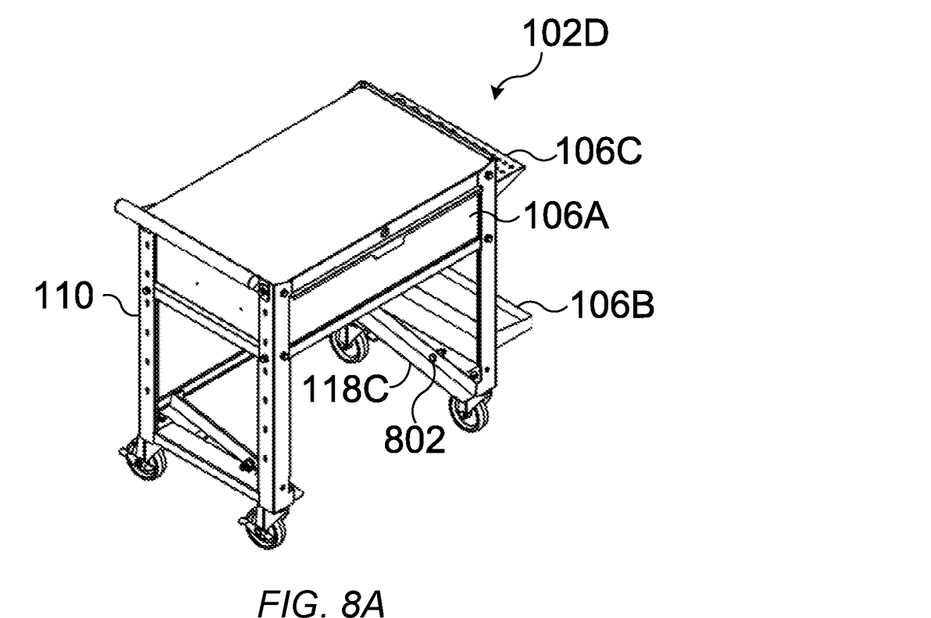
FIG. 8A illustrates an example of a perspective view of a workbench including a holding member pivotably coupled to the workbench in a ramp configuration, according to an embodiment.
Figure 8B:
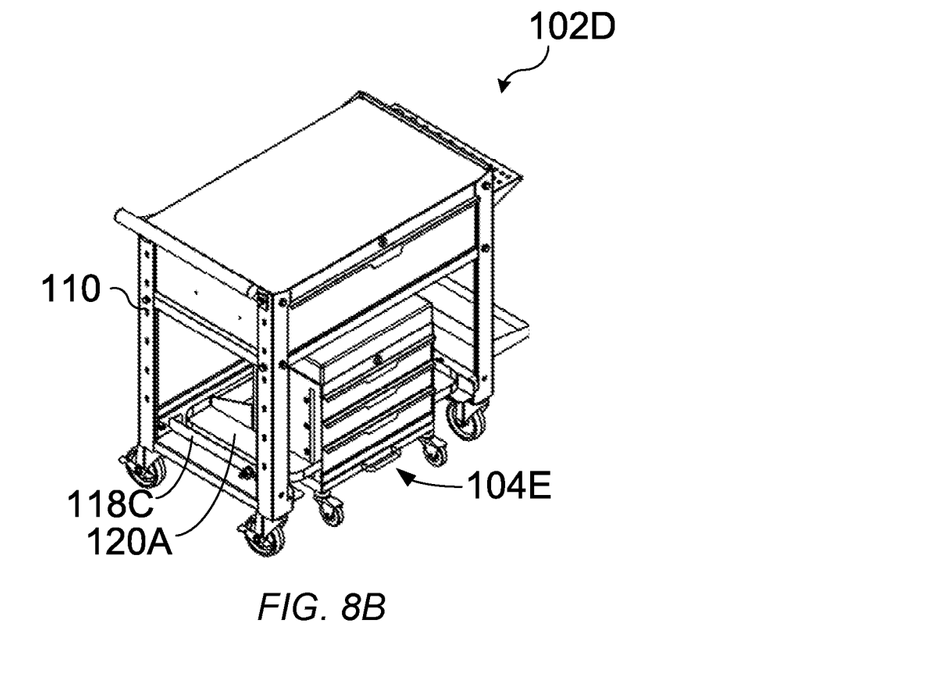
FIG. 8B illustrates an example of a perspective view of a dockable cart in a docked position with a workbench, the workbench having pivotably coupled holding member positioned in the storage configuration, according to an embodiment.

FIG. 8A illustrates an example of a perspective view of a workbench 102D including a holding member 118C pivotably coupled to the workbench 102D in a ramp configuration, according to an embodiment. In the example of FIG. 8A, the workbench 102D can include, but is not limited to, at least one of a frame 110, at least one storage space (e.g., 106A-C), a work surface 114, or wheels 108A as previously described herein. The holding member 118C can be coupled to the frame 110 by a hinge 802, such as a pivot, swivel, or the like. The pivotally coupled holding member (e.g., holding member 118C) can be rotatable between a ramp configuration and a storage configuration. For instance, the ramp configuration is shown in the example of FIG. 8A and the storage configuration is shown in the example of FIG. 8B. The ramp configuration can facilitate guiding and raising the dockable cart, such as dockable cart 104E, into the docked position (as shown in the example of FIG. 8B).

As shown in FIG. 8A, the holding member 118C can be pivotably coupled to the frame 110. The holding member 118C can tilt toward an entry to the docking area. For instance, the holding member 118C can include a first end and a second end. The first end can be located on the front of the cart, for example, where the front of the cart includes access to the docking area. As shown in FIG. 8A, the holding member 118C, when in the docking configuration, can be positioned so the first end is lower than the second end. In the example of FIG. 8A, the holding member 118C or the frame 110 can include an aperture or bushing. The hinge 802 can include a pin (e.g., a bolt). One end of the pin can be fixably or rotatably coupled to one of the holding member 118C and the frame 110. An opposing end of the pin can be located within the aperture or bushing so the holding member 118C can pivot about the pin. In an example, the pin can be located closer to the first end of the holding member 118C than the second end of the holding member 118C. Accordingly, the holding member 118C can tilt downward to engage with the support element (e.g., 120A) of the cart 104E. The holding member 118C can be used to lift the cart 104E as the cart 104E is moved from the undocked position to the docked position.

FIG. 8B illustrates an example of a perspective view of the dockable cart 104E in a docked position with the workbench 102D, the workbench 102D including the pivotably coupled holding member 118C positioned in the storage configuration, according to an embodiment. In the storage configuration, the holding member 118C can be in a substantially horizontal orientation. For instance, the holding member 118C can be level or tilted so the second end of the holding member 118C is lower than the first end of the holding member 118C (e.g., the holding member is between zero and ten-degrees of horizontal). For instance, the hinge 802 can be located between the first end and a center of load when the cart 104E is docked with the holding members 118C. Accordingly, as the center of mass of the cart 104E is moved to a location between the hinge 802 and the second end of the holding member 118C, the holding member 118C can be rotated from the ramp configuration to the storage configuration. A stop feature can be coupled to the holding member 118C or the frame 110 to support the holding member 118 in the substantially horizontal position. Accordingly, the holding member 118C can support the cart 104E, for example, so the cart 104E is held in the docked position on the workbench 102D.

In other further examples, the support element can be pivotally coupled to the cart. For instance, at least one of the holding member 118C, the support element 120A, or both can be pivotally coupled to the frame 110 or the cart 104E respectively. The pivotally coupled support element can include a ramp configuration to engage the holding member. When the cart 104E is moved from the undocked position to the docked position, the support element can be rotated from the ramp configuration to the storage configuration to hold the cart 104E on the workbench 102D.

VARIOUS NOTES & EXAMPLES

Each of these non-limiting examples may stand on its own, or may be combined in various permutations or combinations with one or more of the other examples. To better illustrate the method and apparatuses disclosed herein, a non-limiting list of embodiments is provided here:

Example 1 is an apparatus comprising a workbench and a dockable cart, the apparatus comprising: a workbench frame including a first storage space and a docking area; and a holding member coupled to the workbench frame, the holding member to support the dockable cart using the workbench frame, wherein the dockable cart includes a cart frame having a second storage space and a support element, and wherein the dockable cart is moveable between a docked position where the support element is engaged with the holding member to dock the dockable cart with the workbench frame including lifting the dockable cart, and an undocked position where the dockable cart is separated from the workbench.

In Example 2, the subject matter of Example 1 optionally includes wherein the workbench and dockable cart form a unitized apparatus movable at least using wheels coupled to the workbench frame when the dockable cart is located in the docked position.

In Example 3, the subject matter of any one or more of Examples 1-2 optionally include wherein at least one of the holding member and the support element includes a ramp configured to lift the dockable cart as the dockable cart is positioned into the docked position.

In Example 4, the subject matter of any one or more of Examples 1-3 optionally include wherein at least one of the holding member and the support element includes a roller for slidable engagement between the holding member and the support element.

In Example 5, the subject matter of any one or more of Examples 1-4 optionally include wherein the dockable cart includes a seat.

In Example 6, the subject matter of any one or more of Examples 1-5 optionally include wherein at least one of the first storage space and the second storage space includes a drawer.

In Example 7, the subject matter of any one or more of Examples 1-6 optionally include a plurality of wheels coupled to the dockable cart for rolling the dockable cart.

In Example 8, the subject matter of any one or more of Examples 1-7 optionally include wherein at least one of the holding member and the support element is pivotally coupled to the workbench frame and the cart frame respectively.

In Example 9, the subject matter of Example 8 optionally includes wherein at least one of the pivotally coupled holding member and support element is rotatable between a ramp configuration and a storage configuration, the ramp configuration to guide and raise the dockable cart into the docked position, and the storage configuration to hold the dockable cart in the docked position.

In Example 10, the subject matter of any one or more of Examples 1-9 optionally include a handle coupled to the cart frame and configured to facilitate movement of the dockable cart between the docking position and the undocked position.

Example 11 is a workbench configured to stow a dockable cart, the workbench including: a workbench frame including a first storage space and a docking area, a holding member coupled to the workbench frame, the holding member configured to receive a support element to dock the dockable cart using the holding member of the workbench frame, wherein the dockable cart is moveable between a docked position, where the support element is engaged with the holding member to dock the dockable cart with the workbench frame including lifting the dockable cart, and an undocked position, where the dockable cart is separated from the workbench.

In Example 12, the subject matter of Example 11 optionally includes the dockable cart, wherein the workbench and the dockable cart form a unitized apparatus movable at least using wheels coupled to the workbench frame when the dockable cart is located in the docked position.

In Example 13, the subject matter of any one or more of Examples 11-12 optionally include wherein at least one of the holding member and the support element includes a ramp configured to lift the dockable cart as the dockable cart is positioned into the docked position.

In Example 14, the subject matter of any one or more of Examples 11-13 optionally include wherein at least one of the holding member and the support element includes a roller for slidable engagement between the holding member and the support element.

In Example 15, the subject matter of any one or more of Examples 11-14 optionally include wherein the dockable cart includes a seat.

In Example 16, the subject matter of any one or more of Examples 11-15 optionally include wherein the first storage space includes a drawer.

In Example 17, the subject matter of any one or more of Examples 11-16 optionally include a plurality of wheels coupled to the dockable cart for rolling the dockable cart.

In Example 18, the subject matter of any one or more of Examples 11-17 optionally include wherein at least one of the holding member and the support element is pivotally coupled to the workbench frame and a cart frame of the dockable cart respectively.

In Example 19, the subject matter of Example 18 optionally includes wherein at least one of the pivotally coupled holding member and support element is rotatable between a ramp configuration and a storage configuration, the ramp configuration to guide and raise the dockable cart into the docked position, and the storage configuration to hold the dockable cart in the docked position.

Example 20 is a workbench with a means for docking a dockable cart to the workbench comprising: a workbench frame including a first storage means and a docking area; and a holding means coupled to the workbench frame, the holding means for supporting a dockable cart using the workbench frame, wherein the dockable cart includes a cart frame having a second storage means and a support means, and the dockable cart has a means for moving between a docked position and a undocked position wherein: in the undocked position, the dockable cart is separated from the workbench, and in the docked position, the support means is engaged with the holding means for docking the dockable cart with the workbench frame, wherein at least one of the holding means and the support means includes a means for elevating the dockable cart on the workbench frame.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An apparatus comprising a workbench and a dockable cart, the apparatus comprising:
    a workbench frame including a first storage space and a docking area; and
    a holding member coupled to the workbench frame, the holding member to support the dockable cart using the workbench frame,
    wherein the dockable cart includes a cart frame having a second storage space and a support element,
    wherein the dockable cart is moveable between a docked position where the support element is engaged with the holding member to dock the dockable cart with the workbench frame including lifting the dockable cart, and an undocked position where the dockable cart is separated from the workbench, and
    wherein at least one of the holding member or the support element includes a ramp configured to lift the dockable cart as the dockable cart is positioned into the docked position.

2. The apparatus of claim 1, wherein the workbench and dockable cart form a unitized apparatus movable at least using wheels coupled to the workbench frame when the dockable cart is located in the docked position.

3. The apparatus of claim 1, wherein the holding member includes a ramp configured to lift the dockable cart as the dockable cart is positioned into the docked position.

4. The apparatus of claim 1, wherein at least one of the holding member or the support element includes a roller for slidable engagement between the holding member and the support element.

5. The apparatus of claim 1, wherein at least one of the first storage space or the second storage space includes a drawer.

6. The apparatus of claim 1, comprising a plurality of wheels coupled to the dockable cart for rolling the dockable cart.

7. The apparatus of claim 1, wherein at least one of the holding member or the support element is pivotally coupled to the workbench frame or the cart frame respectively.

8. The apparatus of claim 7, wherein at least one of the holding member or the support element is configured to pivot between a ramp configuration and a storage configuration, the ramp configuration arranged to guide and to raise the dockable cart into the docked position, and the storage configuration arranged to hold the dockable cart in the docked position.

9. The apparatus of claim 1, comprising a handle coupled to the cart frame and configured to facilitate movement of the dockable cart between the docking position and the undocked position.

10. The apparatus of claim 1, wherein the support element includes the ramp configured to lift the dockable cart as the dockable cart is positioned into the docked position.

11. The apparatus of claim 10, wherein the dockable cart includes wheels, and
    wherein at least some of the wheels are elevated off the ground when the dockable cart is positioned into the docked position.

12. A workbench configured to stow a dockable cart, the workbench including:
    a workbench frame including a first storage space, a holding member coupled to the workbench frame, the holding member configured to receive a support element to dock the dockable cart using the holding member of the workbench frame, wherein the dockable cart is moveable between a docked position, where the support element is engaged with the holding member to dock the dockable cart with the workbench frame including lifting the dockable cart, and an undocked position, where the dockable cart is separated from the workbench, wherein at least one of the holding member or the support element includes a ramp configured to lift the dockable cart as the dockable cart is positioned into the docked position.

13. The workbench of claim 12, further comprising the dockable cart, wherein the workbench and the dockable cart form a unitized apparatus movable at least using wheels coupled to the workbench frame when the dockable cart is located in the docked position.

14. The workbench of claim 12, wherein the holding member includes a ramp configured to lift the dockable cart as the dockable cart is positioned into the docked position.

15. The workbench of claim 12, wherein at least one of the holding member or the support element includes a roller for slidable engagement between the holding member and the support element.

16. The workbench of claim 12, wherein the first storage sp ace includes a drawer.

17. The workbench of claim 12, comprising a plurality of wheels coupled to the dockable cart for rolling the dockable cart.

18. The workbench of claim 12, wherein at least one of the holding member and the support element is pivotally coupled to the workbench frame and a cart frame of the dockable cart respectively.

19. The workbench of claim 18, wherein at least one of the pivotally coupled holding member or the support element is rotatable between a ramp configuration and a storage configuration, the ramp configuration arranged to guide and to raise the dockable cart into the docked position, and the storage configuration arranged to hold the dockable cart in the docked position.

20. The workbench of claim 12, wherein the support element includes the ramp configured to lift the dockable cart as the dockable cart is positioned into the docked position.

21. The workbench of claim 20, wherein the dockable cart includes wheels, and wherein at least some of the wheels are elevated off the ground when the dockable cart is positioned into the docked position.

22. A workbench with a means for docking a dockable cart to the workbench comprising:

a workbench frame including a first storage means; and a holding means coupled to the workbench frame, the holding means for supporting a dockable cart using the workbench frame, wherein the dockable cart includes a cart frame having a second storage means and a support means, and the dockable cart has a means for moving between a docked position and a undocked position wherein:

in the undocked position, the dockable cart is separated from the workbench, and in the docked position, the support means is engaged with the holding means for docking the dockable cart with the workbench frame, wherein at least one of the holding means or the support means includes a ramp configured to lift the dockable cart as the dockable cart is positioned into the docked position.

* * * * *

UNITED STATES PATENT AND TRADEMARK OFFICE
CERTIFICATE OF CORRECTION

| | |
|---|---|
| PATENT NO. | : 10,391,625 B2 |
| APPLICATION NO. | : 15/364155 |
| DATED | : August 27, 2019 |
| INVENTOR(S) | : Gang et al. |

It is certified that error appears in the above-identified patent and that said Letters Patent is hereby corrected as shown below:

In the Claims

In Column 12, Line 8, in Claim 1, delete "comp rising:" and insert --comprising:-- therefor In Column 13, Line 28, in Claim 16, delete "sp ace" and insert --space-- therefor Signed and Sealed this
Twenty-fourth Day of March, 2020

Andrei Iancu
*Director of the United States Patent and Trademark Office*